United States Patent
Niebel (10) Patent No.: US 7,620,038 B1
(45) Date of Patent: Nov. 17, 2009

(54) USING HOT SWAP LOGIC IN A COMMUNICATION SYSTEM

(75) Inventor: Werner Niebel, Hollis, NH (US)

(73) Assignee: Starent Networks, Corp., Tewksbury, MA (US)

(*) Notice: Subject to any disclaimer, the term of this patent is extended or adjusted under 35 U.S.C. 154(b) by 701 days.

(21) Appl. No.: 10/892,727

(22) Filed: Jul. 16, 2004

Related U.S. Application Data (60) Provisional application No. 60/487,747, filed on Jul. 16, 2003.

(51) Int. Cl.
*H04Q 11/00* (2006.01)

(52) U.S. Cl. .............. 370/376; 370/352; 370/498; 710/52; 710/100; 711/167

(58) Field of Classification Search .......... 370/376, 370/352, 498; 710/52, 100; 711/167
See application file for complete search history.

(56) References Cited

U.S. PATENT DOCUMENTS

| | | | | |
|---|---|---|---|---|
| 4,086,436 A | * | 4/1978 | Cohen et al. .............. 370/298 |
| 4,398,284 A | * | 8/1983 | Canniff ..................... 370/434 |
| 5,331,632 A | * | 7/1994 | Aaron et al. .............. 370/376 |
| 5,532,686 A | * | 7/1996 | Urbas et al. .............. 340/10.51 |
| 5,668,811 A | * | 9/1997 | Worsley et al. .............. 370/424 |
| 6,034,947 A | * | 3/2000 | Yoshida et al. .............. 370/244 |
| 6,226,288 B1 | * | 5/2001 | Allen .............. 370/376 |
| 6,243,818 B1 | * | 6/2001 | Schwan et al. .............. 713/300 |
| 6,408,349 B1 | * | 6/2002 | Castellano .............. 710/56 |
| 6,587,461 B1 | * | 7/2003 | Parrish et al. .............. 370/387 |
| 2002/0034194 A1 | * | 3/2002 | Young et al. .............. 370/498 |
| 2002/0129215 A1 | * | 9/2002 | Yoo et al. .............. 711/167 |
| 2003/0227906 A1 | * | 12/2003 | Hallman .............. 370/352 |
| 2006/0120360 A1 | * | 6/2006 | Dove et al. .............. 370/376 |
| 2007/0220188 A1 | * | 9/2007 | Garlepp et al. .............. 710/100 |

* cited by examiner

*Primary Examiner*—Ricky Ngo
*Assistant Examiner*—Luat Phung
(74) *Attorney, Agent, or Firm*—Wilmer Cutler Pickering Hale and Dorr LLP (57) ABSTRACT

Methods and systems are provided for providing hot swapability of TSIs in a TDM system using FPGA hot swap logic. The hot swap logic is used to provide isolation for the TSIs from a system TDM bus in the TDM system. Moreover, the hot swap logic is capable of improving the performance of the TDM system. For example, the hot swap logic is capable of compensating for clock distortion associated with the distribution of a common clock signal to various TSIs in the TDM system. Additionally, for example, the hot swap logic is capable of compensating for the limitations imposed in conventional TDM systems due to the relatively high clock-to-out times of conventional TSIs.

42 Claims, 6 Drawing Sheets

USING HOT SWAP LOGIC IN A COMMUNICATION SYSTEM

CROSS REFERENCE TO RELATED APPLICATION

This application claims the benefit under 35 U.S.C. § 119 (e) of U.S. Provisional Patent Application No. 60/487,747, filed Jul. 16, 2003, which is hereby incorporated by reference herein in its entirety.

FIELD OF THE INVENTION

The present invention relates to time division multiplex (TDM) communication systems using time slot interchangers (TSIs). More particularly, this invention relates to TDM communication systems employing hot swap logic as buffers between TSIs and a system TDM bus in the communication systems.

BACKGROUND OF THE INVENTION

Communication systems have been developed that operate on a time division basis. In these systems, for example, a number of telephone conversations are transmitted on a single, shared communication highway, where each conversation is assigned to the common highway for an extremely short, periodically recurring interval or time slot. Moreover, the connection between any two lines in communication is completed only during the assigned time slot. The samples that are transmitted over the common highway in these time slots are utilized in the called line to reconstruct the original signal (telephone conversation).

Figure 1A:
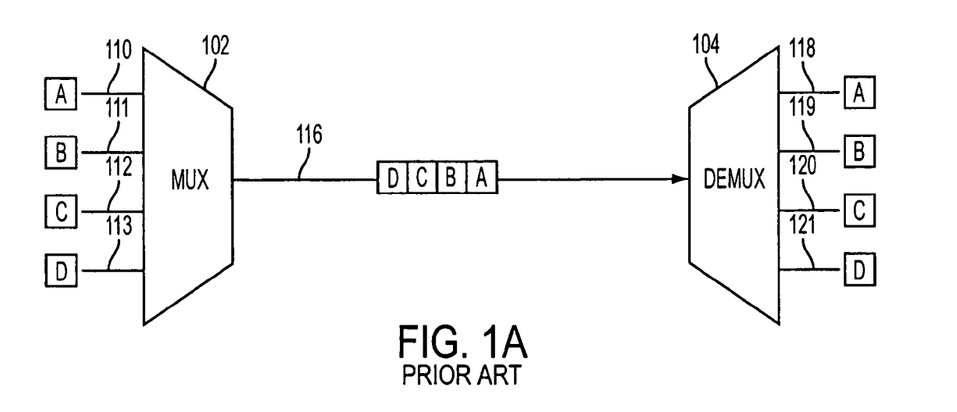
FIG. 1A is a simplified illustration showing the operation of a MUX and a DEMUX in a conventional TDM system.

As an example, FIG. 1A illustrates the operation of a multiplexer (MUX) 102 and a de-multiplexer (DEMUX) 104 in a TDM system. As shown, MUX 102 samples data signals arriving on channels or lines 110-113 and provides these samples, organized into time slots, on a single line 116. DEMUX 104, on the other hand, separates the interleaved data samples being transmitted on line 116 in order to provide respective outputs on lines 118-121.

One problem that often arises in TDM systems is that of "blocking." As known by those skilled in the art, "blocking" arises when one or more stages of switching are introduced between the transmitting and receiving channels, and a portion of the switched path is not available for assignment to a potential connection. One known solution to this problem, generally referred to as "time slot interchanging," is to interchange the time slots assigned to particular data connections in various stages of the TDM system. This solution involves incorporating delay into the data signal transmissions such that data transmitted in one time slot may be shifted to one or more different time slots on its way to the final destination.

Figure 1B:
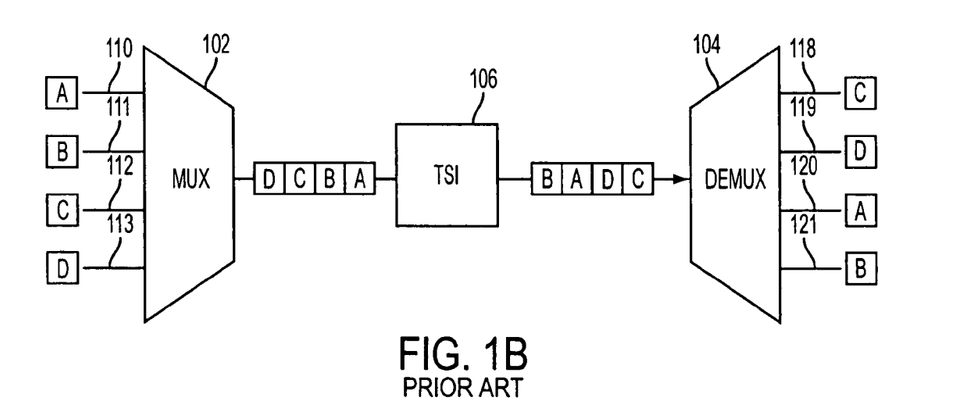
FIG. 1B is a simplified illustration showing the operation of the MUX and DEMUX of FIG. 1A with the addition of a convention TSI.

Time slot interchanging is typically accomplished in TDM systems using one or more TSIs. These TSIs selectively introduce delay in the path of data signals arriving in given time slots such that, upon exiting the TDM system, they appear in different time slots (i.e., data received in one time slot is subsequently provided during another time slot). FIG. 1B illustrates the operation of MUX 102 and DEMUX 104, as described above in connection with FIG. 1B, with the addition of TSI 106. As shown in FIG. 1B, TSI 106 may be used to shift data being transmitted in one time slot to a different time slot.

Several different types of TSIs have been developed, one of which is described in U.S. Pat. No. 3,770,895 to Krupp et al., which is hereby incorporated by reference herein in its entirety. One type of TSI includes a memory device for storing digital information (e.g., voice, video, etc.), a counter, and a control store. The counter generates consecutive addresses that are applied to the memory device, where a portion of a data signal being transmitted (i.e., a time slot) is stored in the location of the memory device that corresponds to each address. The control store also generates addresses (simultaneously with the counter), although these addresses are typically not consecutive, and may be dynamically changed. As these recorded addresses are applied to the TSI memory device (during a read operation), the effect is to switch the order in which the previously stored information is retrieved form the memory device. Accordingly, information stored in the memory device during a particular time slot may be subsequently read from the memory and transmitted during a different time slot. Although a particular type of TSI has been explained above, it will be understood that the present invention may be used in connection with any suitable type of TSI.

Figure 2:
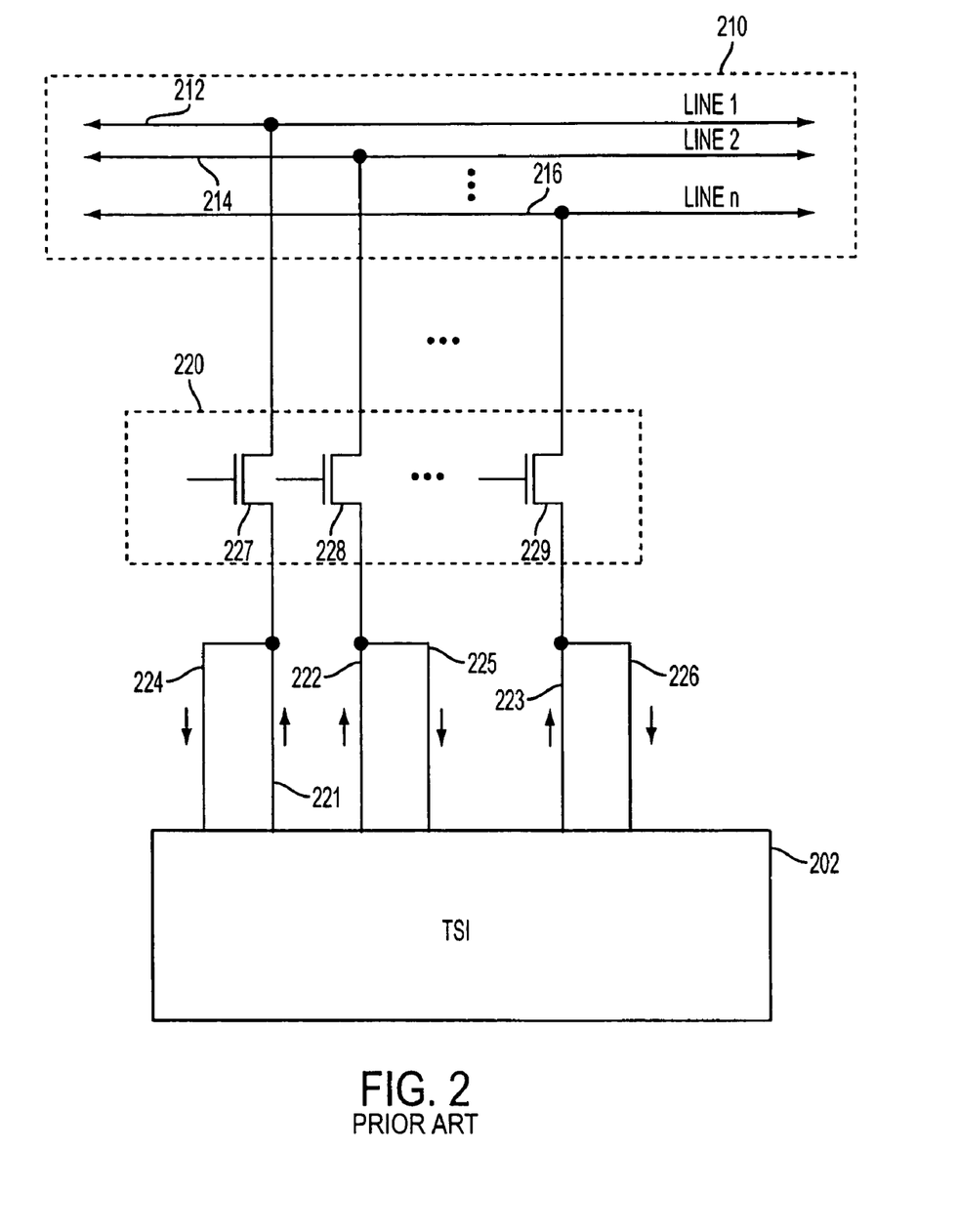
FIG. 2 is a simplified illustration of a portion of a conventional TDM system that includes a TSI isolated from a system TDM bus using FET circuitry.

The implementation of TDM systems using TSIs is generally complicated by the fact that off-the-shelf TSI solutions do not incorporate hot swapability into the buffers inside the device. In other words, existing TSIs do not contain the circuitry necessary to permit on-line insertion and removal (also known as "power-on servicing") of a TSI card from a TDM system. To compensate for this lack of incorporated hot swapability, it is known to use field-effect transistor (FET) circuitry to isolate TSIs from the system TDM bus. FIG. 2 provides a simplified illustration of a portion of such a TDM system.

In FIG. 2, TSI 202 is used for interchanging time slots of data signals being transmitted on system TDM bus 210, which includes n lines 212-216 (each of which carries a time division multiplexed data signal). In general, system TDM bus 210 acts as a global switching block that allows data signals to be placed onto it for transmission, and to later be taken off as necessary (e.g., to provide a data signal to a digital signal processor). TSI 202 operates to "groom" the data traffic on system TDM bus 210, and to switch this traffic to the intended resources.

As with other conventional TSIs, the one shown in FIG. 2 does not incorporate hot swapability into its circuitry. Therefore, it would be problematic to have TSI 202 reside directly on TDM bus 210. In the case of telecommunications and other types of systems, such a configuration would be likely to cause disruptions of data calls in the TDM system. For example, because it is likely that TSI 202 will remain powered off for up to several seconds after being plugged into the TDM system (until a controller in the system powers them up), isolation of these TSIs from system TDM bus 210 is required. Without such isolation, for example, many telephone calls in a telecommunication system would be dropped until, e.g., TSI 202 is fully operational. Additionally, isolation is required to prevent a surge of inrush current from entering TSI 202 upon the initial powering up of this TSI. Absent such isolation, a substantial amount of current from other resources in the TDM system could be sunk, resulting in various types of system failures.

In order to provide the necessary isolation of TSI 202 from system TDM bus 210 as needed, FETs may be used as known in the art. For example, as shown in FIG. 2, the FETs of group 220 are placed into the data path of streams 221-226, where streams 224-226 are inbound to TSI 202 (and outbound from TDM bus 210), and streams 221-223 are outbound from TSI 202 (and inbound from TDM bus 210). In particular, FET 227 is placed in the data path of streams 221 and 224, FET 228 is placed in the data path of streams 225 and 225, and FET 229 is placed in the data path of streams 223 and 226. Typically, the each of FETs 227-229 will be an n-type metal-oxide-semiconductor FET, although this is not required.

FETs 227-229 of group 220 shown in FIG. 2 may be used to provide hot swapability to TSI 202 in the following manner. When TSI 202 is plugged into the TDM system and is operational, FETs 227-229 will simply act as wires (i.e., they will provide a short) between TSI 202 and system TDM bus 210. In particular, the gates of FETs 227-229 are coupled to a pull up resistor (not shown), where the term "coupled" refers to an electrical connection between two circuit elements that may have an intervening circuit element between them. However, before the card containing TSI 202 is powered up, there is no driving current into the gates of FETs 227-229. As the power tied to the gates of FETs 227-229 begins to rise, these FETs slowly become enabled until they eventually remove the isolation between TSI 202 and system TDM bus 210.

While hot swapability may be provided to one or more TSIs using FET circuitry in the manner shown in FIG. 2 and described above, this circuitry provides little or no additional benefits to the TDM system aside from mere isolation of the TSIs from the system TDM bus in the TDM system.

Accordingly, it is desirable to provide methods and systems for providing hot swapability of TSIs in a TDM system such that the performance of the TDM system is improved as well.

SUMMARY OF THE INVENTION

In accordance with the principles of the present invention, methods and systems are provided for providing hot swapability of TSIs in a TDM system in such a manner that also improves the performance of the TDM system. This is accomplished through the use of hot swap logic that, in addition to isolating TSIs from a system TDM bus in the TDM system, enhances various aspects of the TDM system. For example, the hot swap logic according to the invention may be used to compensate for clock distortion associated with the distribution of a common clock signal to various TSIs in the TDM system. Additionally, the hot swap logic may be used to compensate for the limitations imposed on conventional TDM systems due to the relatively high clock-to-out times of conventional TSIs.

In one embodiment, the invention provides a TDM system that includes a system bus for transmitting data signals in the TDM system, a time slot interchanger (TSI) circuit for interchanging time slots of data signals being transmitted on the system bus, and a hot swap logic circuit for selectively isolating the TSI circuit from the system bus, wherein the hot swap logic circuit is coupled between the system bus and the TSI circuit, the logic circuit using a transmit clock signal to clock respective signals from the hot swap logic circuit to the system bus and the TSI circuit and using a receive clock signal that is related in phase to the transmit clock signal to clock respective signals from the system bus and the TSI circuit to the hot swap logic circuit.

In a second embodiment, the invention provides a TDM system that includes means for transmitting data signals onto a system bus in the TDM system, means for selectively interchanging time slots of data signals being transmitted on the system bus, and means for selectively isolating the interchanging means from the system bus, wherein the isolating means comprise means for separately transmitting and receiving a clock for providing data signals between the system bus and the interchanging means.

In a third embodiment, the invention provides a TDM system that includes means for transmitting data signals onto a system bus in the TDM system, first interchanging means for selectively interchanging time slots of data signals being transmitted on the system bus, first isolating means for selectively isolating the first interchanging means from the system bus, second interchanging means for selectively interchanging time slots of data signals being transmitted on the system bus, and second isolating means for selectively isolating the second interchanging means from the system bus, wherein the first and second isolating means comprise means for compensating clock skew associated with a clock signal being distributed to the first and second interchanging means and the first and second isolating means.

In a fourth embodiment, the invention provides a hot swap logic circuit for use in a TDM system, wherein the hot swap logic circuit is coupled between a TSI circuit and a system bus of the TDM system, the hot swap logic circuit including circuitry responsive to a transmit clock signal to clock respective signals from the hot swap logic circuit to the system bus and the TSI circuit and circuitry responsive to a receive clock signal that is generated based on the transmit clock signal to clock respective signals from the system bus and the TSI circuit to the hot swap logic circuit.

In a fifth embodiment, the invention provides systems and methods for providing hot swapability of a TSI circuit in a TDM system that include selectively isolating the TSI circuit from a system bus in the TDM system using a hot swap logic circuit, using a transmit clock signal to clock respective signals from the hot swap logic circuit to the system bus and the TSI circuit, generating a receive clock signal related in phase to the transmit clock signal, and using the receive clock signal to clock respective signals from the system bus and the TSI circuit to the hot swap logic circuit.

In a sixth embodiment, the invention provides system and methods for performing a diagnostic evaluation in a TDM system comprising a first and second hot swap logic circuit that include transmitting a data pattern from the first hot swap logic circuit to the second hot swap logic circuit, reading the data pattern by the second hot swap logic circuit using a first local receive clock signal, returning the data pattern read by the second hot swap logic circuit to the first hot swap logic circuit, reading the returned data pattern by the first hot swap logic circuit using a second local receive clock signal, adjusting the first and second local receive clock signals, and repeating the steps of transmitting the data pattern from the first hot swap logic circuit, reading the data pattern by the second hot swap logic circuit, returning the data pattern read by the second hot swap logic, and reading the returned data pattern by the first hot swap logic circuit.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout.

DETAILED DESCRIPTION OF THE INVENTION

Methods and systems are provided for providing hot swapability of TSIs in a TDM system. The hot swapability of TSIs is provided using hot swap logic constructed in accordance with the principles of the present invention which, as explained below, also improves the performance of the TDM system.

Figure 3A:
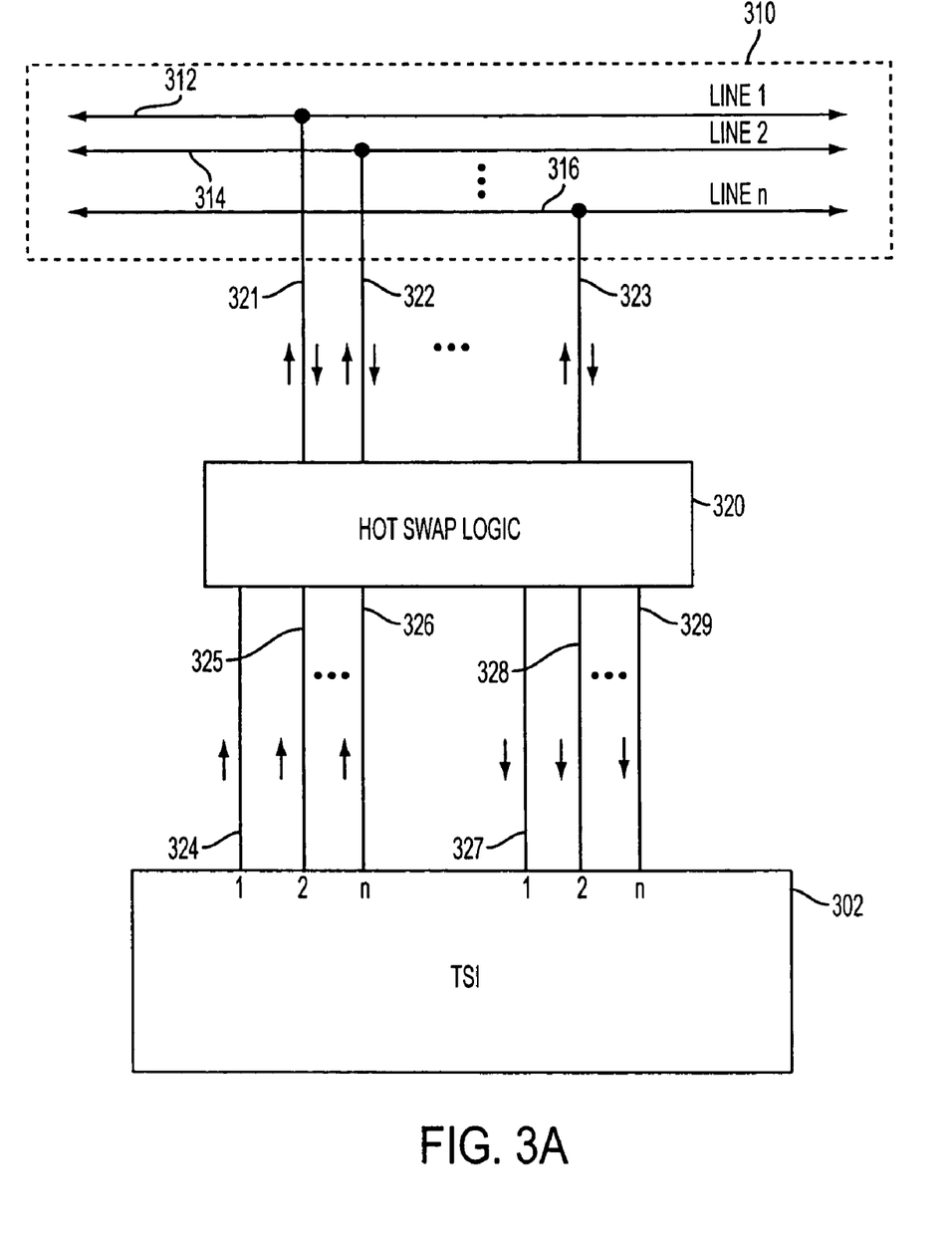
FIG. 3A is a simplified illustration of a portion of a TDM system that includes a TSI able to be selectively isolated from a system TDM bus using hot swap logic constructed in accordance with the principles of the present invention.

FIG. 3 is a simplified illustration of a portion of a TDM system that includes a TSI 302 that is selectively isolated from system TDM bus 310 in accordance with the principles of the present invention. TSI 302 may be any suitable type of TSI that is capable of interchanging time slots of the data signals being distributed on TDM bus 310, which includes n lines 312-316 (where n is any suitable number). It will be understood that, in connection with TSI 302, there are n transmit and receive streams (one transmit and receive stream for each of the n lines in system TDM bus 310). Moreover, each stream going into, or coming out of, TSI 302 has m time slots (e.g., time sliced voice data) per stream. For example, assume that there are m=128 telephone calls being time division multiplexed onto each line 312-316 of system TDM bus 310. Moreover, assume that there are n=128 lines in TDM bus 310. In this case, there would be 128 transmit and receive data streams, with 128 time sliced calls on each stream, going to and from TSI 302. The purpose of TSI 302, as is well known in the art, is to "groom" the data being transmitted on system TDM bus 310, and to switch this traffic to the proper destination resources.

According to the principles of the present invention, hot swap logic 320 is used to buffer (selectively isolate) TSI 302 from system TDM bus 310. In particular, hot swap logic 320 is used to prevent failures in the TDM system that might otherwise occur when a card containing TSI 302 (and potentially additional TSIs) is newly inserted into the TDM system, or when power is not applied to TSI 302. Moreover, hot swap logic 320 is also used to improve the overall performance of the TDM system as explained below.

As shown, hot swap logic 320 is placed into the data path of various streams connecting system TDM bus 310 and TSI 302. In particular, as shown in FIG. 3, bidirectional streams 321-323 are coupled between system TDM bus 310 and hot swap logic 320. Moreover, streams 324-329 are coupled between hot swap logic 320 and TSI 302, where streams 327-329 are inbound to TSI 302 (and outbound from hot swap logic 320) and streams 324-326 are outbound from TSI 302 (and inbound to hot swap logic 320). Generally, as shown in FIG. 3A, there will be one bidirectional stream (for both transmitting and receiving data) for connecting each line 312-316 of system TDM bus 310 to hot swap logic 320, and two unidirectional streams (a transmit and a receive stream) per line 312-316 of system TDM bus 310 for connecting hot swap logic 320 to TSI 302.

Figure 3B:
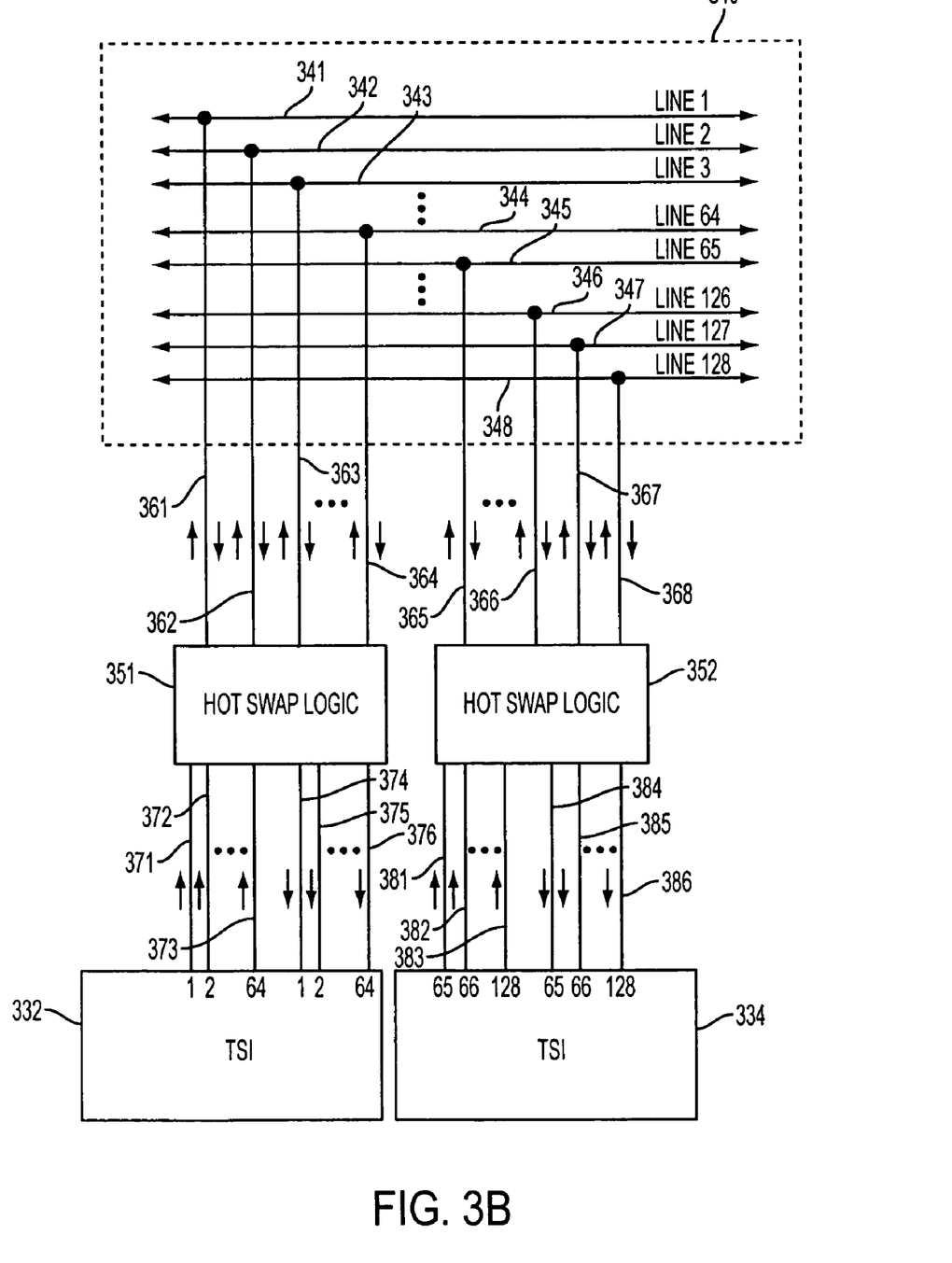
FIG. 3B is a simplified illustration of a portion of a TDM system that includes a pair of TSIs residing on a single card that are able to be selectively isolated from a system TDM bus using hot swap logic constructed in accordance with the principles of the present invention.

It will be understood by persons versed in the art that multiple TSIs similar to TSI 302 may reside on a single card that is used to provide time slot interchanging for the signals being carried on a system bus such as system TDM bus 310. For example, as shown in FIG. 3B, a pair of TSIs 332 and 334 may reside on a single card, where each of these TSIs operates on the time division multiplexed signal being carried on half of the lines in system TDM bus 340. In the embodiment shown in FIG. 3B, system TDM bus 340 includes 128 lines 341-348. Moreover, as shown, bidirectional data streams 361-364 are coupled between hot swap logic function 351, which is associated with TSI 332, and half (i.e., 64) of the lines of system TDM bus 340 (i.e., lines 341-344). There are also 128 streams 371-376 coupled between hot swap logic 351 and TSI 332. Moreover, bidirectional data streams 365-368 are coupled between hot swap logic function 352, which is associated with TSI 334, and the other half of the lines of system TDM bus 340 (i.e., lines 345-348). There are also 128 streams 381-386 coupled between hot swap logic 352 and TSI 334. Using this configuration, half of the bandwidth association with system TDM bus 340 would be protected if one of TSIs 351-352 were to fail. Persons skilled in the art will understand that the embodiment shown in FIG. 3B is for illustrative purposes only. For example, more than 128 lines 341-348 may be present in system TDM bus 340. Additionally, for example, hot swap logic 351 may be associated with one-third of the lines of system TDM bus 340, while hot swap logic 352 is associated with any or all of the remaining lines. Moreover, it will be understood that more than two TSIs 351-352 can "share" system TDM bus 340 in this manner.

Figure 4:
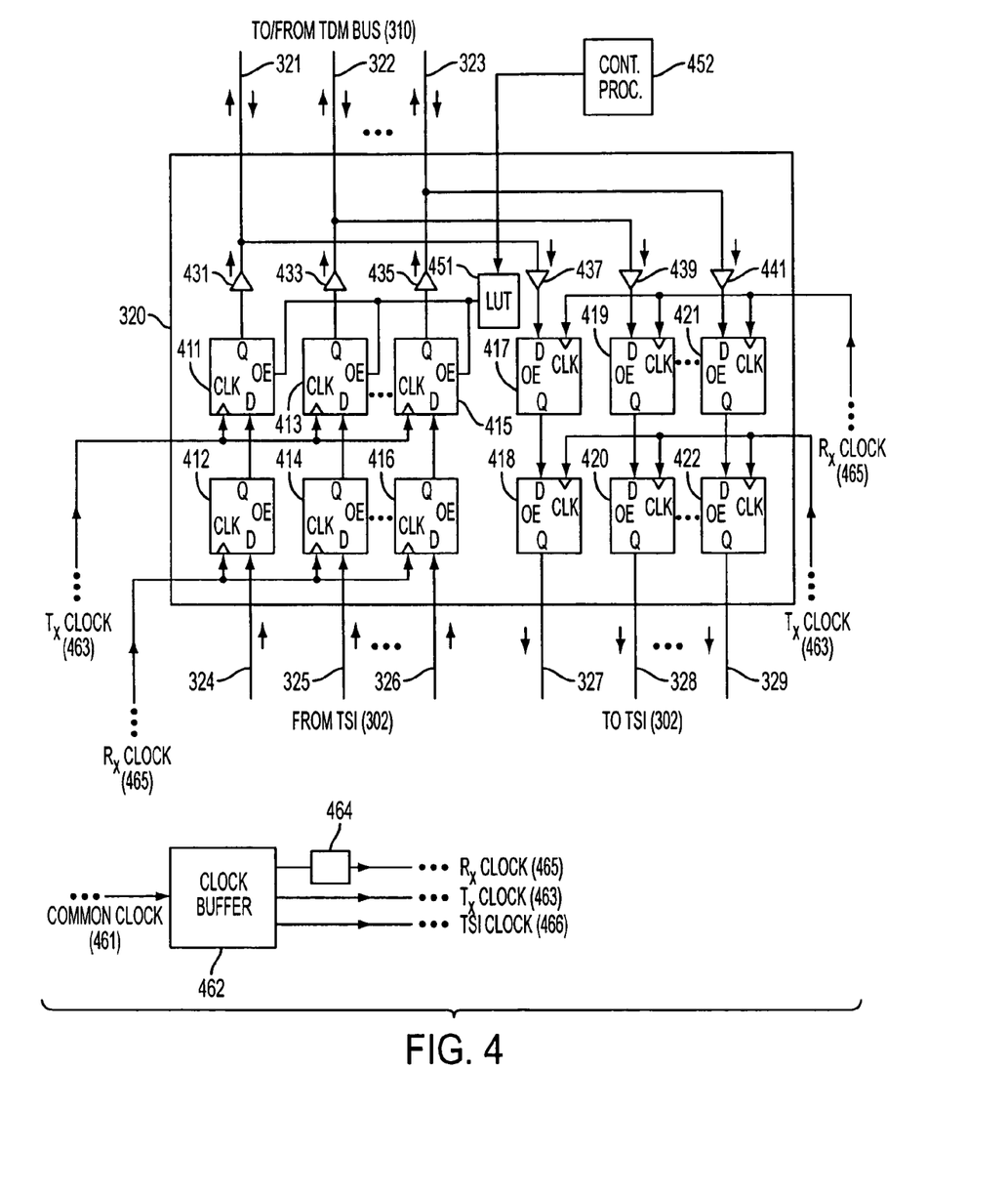
FIG. 4 is a more detailed but still simplified illustration of the hot swap logic shown in FIG. 3A according to one embodiment of the present invention.

FIG. 4 is a more detailed (but still simplified) illustration of one embodiment of hot swap logic 320 shown in FIG. 3A according to the principles of the present invention. In a preferred embodiment of the present invention, field programmable gate array (FPGA) technology is used to construct hot swap logic 320, which not only provides isolation of TSI 302 from system TDM bus 310 as needed (and thus hot swapability for TSI 302), but also improves the overall performance of the TDM system. As shown, hot swap logic 320 includes a plurality of D-type flip flops 411-422.

As also shown in FIG. 4, hot swap logic 320 includes gates 431, 433, and 435 to provide buffering for the data outputs (Q) of flip-flops 411, 413, and 415, respectively, before these outputs are provided to the system TDM bus 310. On the reverse side, gates 437, 439, and 441 shown in FIG. 4 are used to provide buffering for the sampled data from system TDM bus 310 before being provided to the data inputs (D) of flip-flops 417, 419, and 421, respectively. Among other things, these buffers are used in hot swap logic 320 to enable hot swapability of TSI 302 (as explained below).

In hot swap logic 320, there is one pair of flip-flops for each of the streams 327-329 going into TSI 302 and one pair of flip-flops for each of the streams 324-326 coming out of TSI 302. As shown in FIG. 4, flip-flops 411 and 412, for example, are used in connection with stream 324 coming out of TSI 302. Using clock signals as described below, hot swap logic may operate as follows in one embodiment of the invention. Flip-flop 412 receives data from TSI 302 and clocks this data in. Next, the data is clocked from flip-flop 412 to outbound flip-flop 411. Finally, the data which originated from TSI 302 is clocked onto the system TDM bus 310. Once the data is on the system TDM bus 310, moreover, another hot swap logic FPGA (not shown) may then switch the data in. For example, the equivalent of flip-flop 417 in the FPGA of another hot swap logic, not shown, may clock in the data. Next, the data would clock to the equivalent of flip-flop 418, and then finally to the associated TSI. According to the invention, and as explained in greater detail below, the present invention derives much benefit from being able to use different transmit and receive clock signals (e.g., when flip-flop 417 of the different FPGA clocks in data from system TDM bus 310 using a receive clock that is shifted three-quarter phase (that is, three-quarters of a clock period) of a transmit clock used by flip-flop 411).

As also shown in FIG. 4, a look-up table (LUT) 451 provides output enable (OE) signals to each of flip-flops 411, 413, and 415. LUT 451 is used to selectively enable and disable time slots on system TDM bus 310. In particular, LUT 451 instructs TSI 302 when to "get onto" system TDM bus 310 and when to "get off of" system TDM bus 310 such that no two TSIs in the TDM system will be driving the same line 312-316 in the system TDM bus 310 at the same time. More particularly, LUT 451 provides a programmable mechanism by which data can be configured to be either driven from TSI 302 to system TDM bus 310, or to be tri-stated (e.g., when buffers 431, 433, or 435 in hot swap logic 320 are driven to a high impedance state). For example, assuming there are 64,000 time slots on each line 312-316 of system TDM bus 310, LUT 451 is used to tell the FPGA of hot swap logic 320 which of those 64,000 time slots are assigned to TSI 302. As known in the art, a host or CPU interface (e.g., control processor 452) may be used to program LUT 451 with the necessary information to accomplish the above-described function (using a similar process to that which may be used to program TSI 302 regarding where to switch the data from system TDM bus 310.

In the embodiment of the invention shown in FIG. 4, OE signals are not provided by LUT 451 to any of receive flip-flops 417, 419, and 411. This is because the FPGA of hot swap logic 320 is a dedicated resource (i.e., it is not being shared among different TSIs), and thus, all signals may be driven to the corresponding TSI 302. Upon receipt of the data, TSI 302 can decide whether to switch it or not. The invention, however, is not limited in this manner.

In accordance with the principles of the present invention, hot swap logic 320 shown in FIG. 3 (and in greater detail in FIG. 4) is used to provide enhanced hot swap capability in connection with TSI 302. For example, the buffers 431, 433, 435, 437, 439, and 441 of hot swap logic 320 may be used to provide a current limiting factor that would not otherwise be provided by using a simple FET as described above in connection with FIG. 2. As a result, only a limited amount of current is allowed into TSI 302 at the time of insertion into the TDM system (rather than a surge of current) such that other cards in the TDM system which are already live (i.e., operational) are not adversely affected.

In addition, as explained in greater detail below, hot swap logic 320 is also able to improve the overall performance of the TDM system in the following ways. First, for example, hot swap logic 320 may be used to compensate for clock distortion and data distortion associated with the distribution of a common clock signal and bussed data to various TSIs in the TDM system. In order to understand the benefits of using flip-flops 411-422 in hot swap logic 320, it is useful to consider a typical personal computer that has a peripheral component interconnect (PCI) bus between various components (and boards) in the computer. It will be understood that, in this example, the more loading that exists on the PCI bus, the greater the level of overall performance degradation there will be due to stated clock distortion and loading on the bussed system. For example, there will generally at least some distortion between the time one card clocks out a clock signal and when another card (neighboring or otherwise) thinks it was clocked out (because of the associated clock jitter from one card to the another which may be due to inherent differences between different TSIs (manufacturing differences), various loading conditions, etc.).

To compensate for this type of distortion, flip-flops 411-422 are used to provide flexibility in terms of when data can be sampled from system TDM bus 310. For example, flip-flops 411-422 are used to keep the "clock domain" on the system TDM bus 310 side and the TSI 302 side separate, such that the sampling of signals off of system TDM bus 310 and the driving of TSI 302 can occur at different phases of the clock period.

The above is accomplished using separate clock signals for driving the receiving flip-flops (i.e., flip-flops 412, 414, 416, 417, 419, and 421) and the transmitting flip-flops (i.e., flip-flops 411, 413, 415, 418, 420, and 422) of hot swap logic 320. As shown in FIG. 4, a common clock signal 461 (from a central timing source or module, not shown) in the TDM system is distributed to clock buffer 462, which in turn produces three copied clock signals. It will be understood by persons versed in the art that any suitable type of clock buffer (or a similarly functioning component) that is capable of copying common clock signal 461 may be used for this purpose. One of the three copied clock signals is used as the transmit ($T_x$) clock signal 463 that is provided to transmit flip-flops 411, 413, 415, 418, 420, and 422 of hot swap logic 320. A second of the three copied clock signals is used by clock generation circuit 464 (which, although not shown as such in the figures, is generally local to hot swap logic 320) to generate the receive ($R_x$) clock signal 465 that is provided to receive flip-flops 412, 414, 416, 417, 419, and 421. In various embodiments of the present invention, clock generation circuit 464 is selected such that it is capable of altering $R_x$ clock signal 465 in extremely small increments, e.g., 1 ns. Finally, the third copied clock signal is used as the TSI clock signal 466 that is provided to TSI 302 and any other TSIs operating on data signals being transmitted on system TDM bus 310. It will be understood that, although $T_x$ and $R_x$ clock signals 463 and 465 are generated external to hot swap logic 320 in the embodiment shown in FIG. 4, the invention is not limited in this manner. Moreover, although not shown in any of the figures, as known in the art, TSI 302 also has its own transmit and receive clocks that are generated internally to TSI 302.

The generation of $R_x$ clock signal 465 based on common clock signal 461 (of which $T_x$ is a copy) provides a great deal of flexibility in dealing with distortion of clock signals that may be present in the TDM system. For example, $R_x$ clock signal 465 can be generated at a certain phase off of the $T_x$ clock signal 463 (e.g., 270 degrees) to account for propagation delays, delays in circuitry, etc. that may arise when $T_x$ clock signal 461 is being distributed to various TSIs (similar to TSI 302) in the TDM system. In this manner, clock skew between $T_x$ clock signals 461 arriving at different cards in the TDM system can be compensated for using hot swap logic 320. According to the principles of the present invention, any suitable type of analysis may be employed alone or in combination with a trial and error method to determine the optimal phase difference between $T_x$ clock signal 463 and $R_x$ clock signal 465.

The hot swap logic 320 can also be used to compensate for high clock-to-out times of TSI 302, where a clock-to-out time refers to the time period between when a clock arrives at a flip-flop to when the data is valid. Off the shelf TSIs typically may operate with a 32 MHz clock with data coming out, thus providing a 30 ns window of time in which to drive and sample the data. Moreover, these TSIs generally require approximately 15-27 ns from clock-to-out, leaving only 3 ns is some cases to perform the other necessary functions. By isolating TSI 302 using hot swap logic 320, it is possible to isolate this bad characteristic given that the FPGA being used to implement hot swap logic 320 has a much better clock-to-out time (approximately 3-4 ns) than TSI 302.

It will be understood that, as another benefit of using hot swap logic 320, slew limiting (i.e., limiting the rise time of data) of buffers 431, 433, and 435 may be provided in order to help timing and/or to alter the input/output (I/O) strength depending on the TDM system conditions. For example, hot swap logic 320 provides the ability to have a lightly loaded system (e.g., 8 mA) in one instance, where loading is measured at points on system TDM bus 310, and to subsequently increase the drive strength as necessary (e.g., to 16 mA). In the former case (i.e., a lightly loaded system), it is possible that data will take longer to settle out (longer clock-to-out time), however, there are also many benefits such as reduced power consumption and noise reduction. In the latter case, the drive strength can be increased, typically resulting in the data being driven harder, and thus, in the clock-to-out time being decreased (at the cost of increased noise and power consumption). The ability to provide slew limiting in this manner provides flexibility not provided when using a FET alone to isolate TSI 302 from system TDM bus 310. For example, because of variation of process, voltage, and temperature, the manufacturer of TSI 302 specifies a wide range of times when data can be sampled by its receive clock (based on the expected internal clock distortion). Using a FET alone, therefore, this typically means that only limited loads can be put on system TDM bus 310 in order to ensure that data is available for sampling when required.

Figure 5:
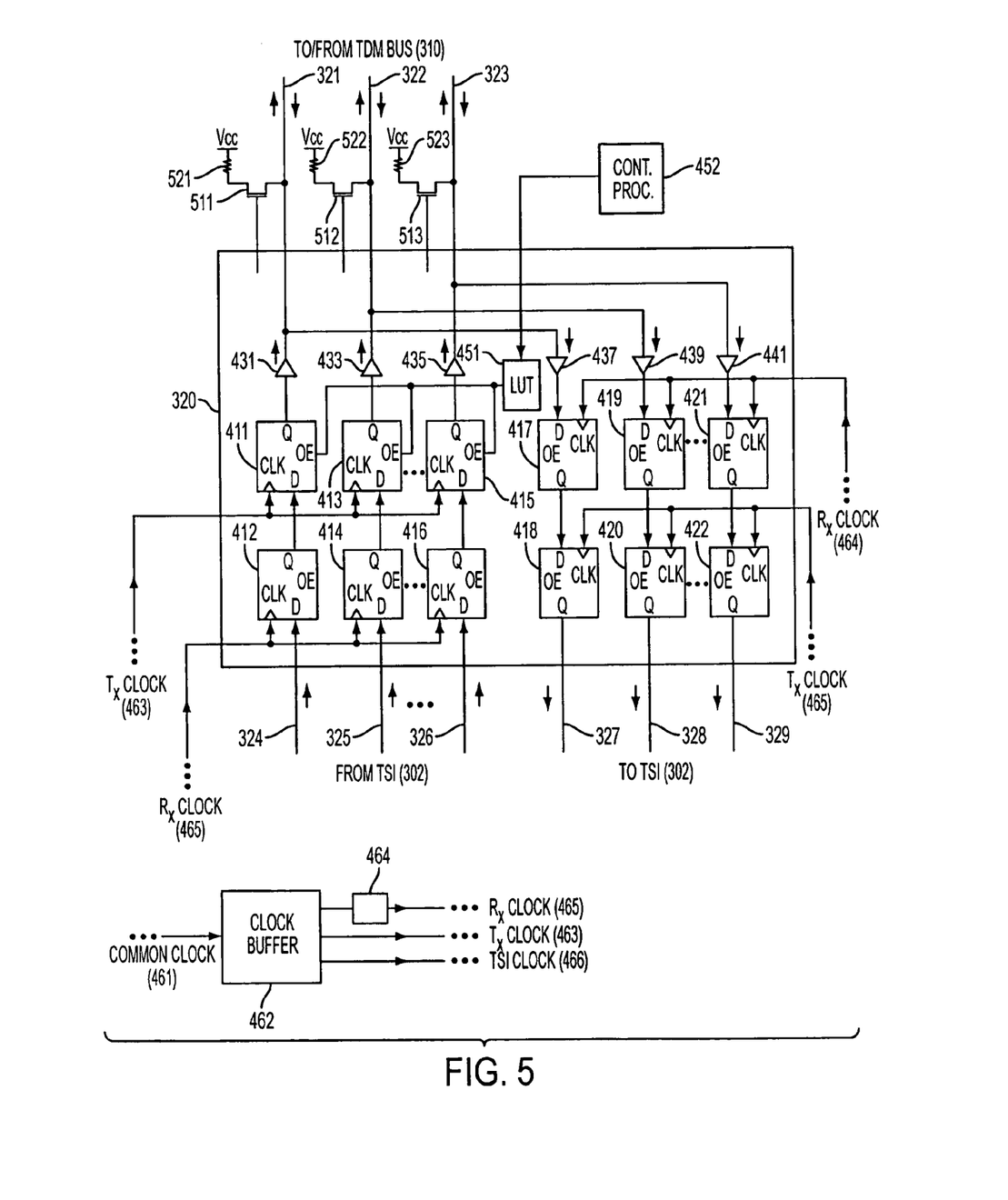
FIG. 5 is simplified illustration of a portion of a TDM system that uses the hot swap logic shown in FIGS. 3 and 4 together with I/O flexibility circuitry according to another embodiment of the present invention.

FIG. 5 is a simplified illustration of a portion of a TDM system that uses the hot swap logic 320 shown in FIGS. 3 and 4 as described above, together with I/O flexibility circuitry according to several embodiments of the present invention. In particular, as shown in FIG. 5, FETs 511-513 and pull-up resistors 521-523 (each of which is coupled to the same or a different $V_{cc}$, which may be, for example, 1.5V) are used to provide flexibility in terms of the I/O technology being used by the FPGA of hot swap logic 320 (i.e., to provide flexibility in choosing a buffer family).

For example, it is known that certain technologies, such as Gunning Transceiver Logic Plus (GTLP, or GTL+), require a resistive termination with a pull-up (e.g., 1.5 V). In transistor-transistor logic (TTL), on the other hand, a resistive termination with pull-up is not used. Therefore, according to the principles of the present invention, FETs 511-513 are used to allow for different termination configurations as required (e.g., when using GTL+ or TTL technology). In particular, when it is desired to use TTL technology in the FPGA of hot swap logic 320, the gates of FETs 511-513 are not driven, such that these FETs become the equivalent of an open circuit. On the other hand, the gates of FETs 511-513 are driven high when it is desired to configure the FPGA of hot swap logic 320 to use GTL+ technology. In this manner, FETs 511-513 are used to easily configure different technologies requiring different terminations. It will be understood that any suitable logic (not shown) may be used in the FPGA of hot swap logic 320 to control the drive current being provided to the gates of FETs 511-513. For example, one or more control registers (not shown) inside the FPGA of hot swap logic 320 can be used to control the enable signals for FETs 511-513.

It will be appreciated by those skilled in the art that switching between GTL+ and TTL technology, for example, can greatly improve the performance of the TDM system. For example, in the embodiment of the present invention shown in FIG. 5, it is possible to easily configure FETs 511-513 to work with GTL+ at times when higher performance (at the cost of higher power consumption) is desired. Moreover, FETs 511-513 may alternatively be configured to work with TTL when high performance is not necessary and power conservation is desired.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, according to various other embodiments of the present invention, an additional stream (or streams), not shown in any of FIGS. 3-5, is added between system TDM bus 310 and hot swap logic 320. This additional stream may be used, for example, to send messages such as statistics that could be shared among cards and FPGAs in the TDM system. It will be understood that other types of information carrying messages may also be shared in this manner, and that such messages may be sent using any suitable type of messaging scheme as known in the art.

Furthermore, it will be understood that test patterns, e.g., from a BERT (Bit Error Rate Tester), can be driven by each hot swap logic element (e.g., hot swap logic 320), read in using the adjustable receive clock associated with each hot swap logic element, and transmitted back to the sending hot swap logic element. Using the adjustable receive clock, margining can be performed by determining boundaries where valid data is transmitted and where data is corrupted because the data is sampled in already mentioned regions of distortion. This can be done among n different cards simultaneously, using time slots on the additional stream (or streams). Accordingly, in the manner described above, the present invention can be used for diagnostic purposes in connection with a TDM system.

It will be understood that certain features which are well known in the art have not been described in order to avoid complication of the subject matter of the present invention. For example, it is known by those skilled in the art that, although not shown in FIG. 2 or 3, data streams will generally be available in the TDM system to convey data from the TSIs to a T1, one or more DSPs, or other resources. The present invention is limited only by the claims which follow.

What is claimed is:

1. A communication system comprising:

a system bus for transmitting data signals;

a time slot interchanger (TSI) circuit for interchanging time slots of data signals being transmitted on the system bus; and a hot swap logic circuit for selectively isolating the TSI circuit from the system bus, wherein the hot swap logic circuit is coupled between the system bus and the TSI circuit, such that data signals flow from the system bus, through the hot swap logic, to the TSI for interchanging, back through the hot swap logic, and back to the system bus, the hot swap logic allowing on-line insertion and removal of the TSI circuit, the hot swap logic circuit responsive to a transmit clock signal to clock respective signals from the hot swap logic circuit to the system bus, the hot swap logic circuit also responsive to the transmit clock signal to clock respective signals from the hot swap logic circuit to the TSI circuit, the hot swap logic responsive to a receive clock signal that is related by a predetermined phase to the transmit clock signal to clock respective signals from the system bus, and the hot swap logic responsive to the receive clock to clock respective signals from the TSI circuit to the hot swap logic circuit.

2. The system of claim 1, wherein the receive clock signal is generated by a clock generation circuit based on the transmit clock signal.

3. The system of claim 1, wherein the hot swap logic circuit includes a field programmable gate array (FPGA) circuit.

4. The system of claim 1, wherein the system bus comprises a plurality of data lines and the hot swap logic circuit comprises, for each data line, a first transmit flip-flop, a second transmit flip-flop, a first receive flip-flop, and a second receive flip-flop.

5. The system of claim 4, wherein the first receive flip-flop of the hot swap logic circuit receives data signals from the TSI circuit based on the receive clock signal and the second receive flip-flop receives data signals from a line in the system bus based on the receive clock signal.

6. The system of claim 5, wherein the first transmit flip-flop of the hot swap logic circuit provides data signals received from the first receive flip-flop of the hot swap logic circuit to a line in the system bus based on the transmit clock signal.

7. The system of claim 6, wherein the first transmit flip-flop of the hot swap logic circuit provides the data signals to the line in the system bus through a buffer in the hot swap logic circuit.

8. The system of claim 5, wherein the second transmit flip-flop of the hot swap logic circuit provides data signals received from the second receive flip-flop of the hot swap logic circuit to the TSI circuit based on the transmit clock signal.

9. The system of claim 8, wherein the second receive flip-flop of the hot swap logic circuit receives the data signals from a line in the system bus through a buffer in the hot swap logic circuit.

10. The system of claim 4, wherein the hot swap logic circuit further comprises a look-up table for selectively enabling time slots on the system bus.

11. The system of claim 10, wherein the look-up table provides an output enable signal to the first transmit flip-flop of the hot swap logic circuit.

12. The system of claim 11, wherein the look-up table is programmed using a control processor in the TDM system.

13. The system of claim 1, further comprising I/O flexibility circuitry for configuring the input-output technology being used by the hot swap logic circuit.

14. The system of claim 13, wherein the I/O flexibility circuitry is configured to provide the hot swap logic circuit with a resistive termination during a first period of time but not during a second period of time.

15. The system of claim 13 further comprising an additional TSI and an additional hot swap logic circuit associated with the additional TSI, wherein the TSI is used to interchange time slots of data signals being transmitted on a first portion of the system bus and the additional TSI is used to interchange time slots of data being transmitted on a second portion of the system bus.

16. The system of claim 15, wherein the system bus comprises a plurality of data lines, the first portion representing approximately half of the data lines of the system bus and the second portion representing some or all of the remainder data lines of the system bus.

17. A communication system having a system bus, the system comprising:

means, coupled to the system bus, for selectively interchanging time slots of data signals being transmitted on the system bus; and means for selectively isolating the interchanging means from the system bus to allow on-line insertion and removal of the means for selectively interchanging time slots, wherein the selectively isolating means includes means for controlling transmission of signals from the selectively isolating means to the system bus and the interchanging means and controlling transmission of respective signals from the system bus and the interchanging means to the selectively isolating means, the isolating means further for compensating for clock distortion and clock skew.

18. A communication system having a system bus, the system comprising:

first interchanging means, coupled to the system bus, for selectively interchanging time slots of data signals being transmitted on the system bus;

first isolating means for selectively isolating the first interchanging means from the system bus to allow on-line insertion and removal of the means for selectively interchanging time slots;

second interchanging means for selectively interchanging time slots of data signals being transmitted on the system bus; and second isolating means for selectively isolating the second interchanging means from the system bus to allow on-line insertion and removal of the means for selectively interchanging time slots, wherein the first and second isolating means includes means for compensating for clock skew associated with a clock signals being distributed to the first and second interchanging means and the first and second isolating means.

19. A hot swap logic circuit for use in a communication system, the hot swap logic circuit being coupled between a time slot interchanger (TSI) circuit such that data signals flow from the system bus, through the hot swap logic, to the TSI for interchanging, back through the hot swap logic, and back to the system bus, and a system bus of the communication system, the hot swap logic circuit having circuitry responsive to a transmit clock signal to clock respective signals from the hot swap logic circuit to the system bus, the hot swap logic circuit having circuitry responsive to a transmit clock signal to clock respective signals from the hot swap logic circuit to the TSI circuits, and circuitry responsive to a receive clock signal that is generated based on the transmit clock signal to clock signals from the system bus to the hot swap logic circuit, and responsive to the receive clock signal to clock signals from the TSI circuit to the hot swap logic circuit.

20. The hot swap logic circuit of claim 19, wherein the hot swap logic circuit is implemented using a field programmable gate array (FPGA) circuit.

21. The hot swap logic circuit of claim 19, wherein the system bus includes a plurality of data lines and the hot swap logic circuit includes, for each data line, a first transmit flip-flop, a second transmit flip-flop, a first receive flip-flop, and a second receive flip-flop.

22. The hot swap logic circuit of claim 21, wherein the first receive flip-flop of the hot swap logic circuit receives data signals from the TSI circuit based on the receive clock signal and the second receive flip-flop receives data signals from a line in the system bus based on the receive clock signal.

23. The hot swap logic circuit of claim 22, wherein the first transmit flip-flop of the hot swap logic circuit provides data signals received from the first receive flip-flop of the hot swap logic circuit to a line in the system bus based on the transmit clock signal.

24. The hot swap logic circuit of claim 23, wherein the first transmit flip-flop of the hot swap logic circuit provides the data signals to the line in the system bus through a buffer in the hot swap logic circuit.

25. The hot swap logic circuit of claim 21, wherein the second transmit flip-flop of the hot swap logic circuit provides data signals received from the second receive flip-flop of the hot swap logic circuit to the TSI circuit based on the transmit clock signal.

26. The hot swap logic circuit of claim 25, wherein the second receive flip-flop of the hot swap logic circuit receives the data signals from a line in the system bus through a buffer in the hot swap logic circuit.

27. The hot swap logic circuit of claim 21, wherein the hot swap logic circuit further comprises a look-up table for selectively enabling time slots on the system bus.

28. The hot swap logic circuit of claim 27, wherein the look-up table provides an output enable signal to the first transmit flip-flop of the hot swap logic circuit.

29. The hot swap logic circuit of claim 27, wherein the look-up table is programmed using a control processor in the TDM system.

30. A method for providing hot swapability of a time slot interchanger (TSI) circuit in a communication system in which hot swap logic selectively isolates the TSI circuit from a system bus to permit on-line insertion and removal of the TSI circuit, comprising the method of
clocking respective signals from the hot swap logic circuit to the system bus and the TSI circuit in response to a transmit clock signal;
receiving a receive clock signal related by a predetermined phase to the transmit clock signal; and
using the receive clock signal to clock respective signals from the system bus and the TSI circuit to the hot swap logic circuit.

31. The method of claim 30, wherein the receive clock is generated based on the transmit clock signal by a clock generation circuit.

32. The method of claim 30, wherein the hot swap logic circuit is implemented using a field programmable gate array (FPGA) circuit.

33. The method of claim 30, wherein the system bus comprises a plurality of data lines, the method further comprising, for at least one data line, the steps of:
clocking a first transmit flip-flop in the hot swap logic circuit to transmit data signals to the system bus;
clocking a second transmit flip-flop in the hot swap logic circuit to transmit data signals to the TSI circuit;
clocking a first receive flip-flop in the hot swap logic circuit to receive data signals from the TSI circuit; and
clocking a second receive flip-flop in the hot swap logic circuit to receive data signals from the system bus.

34. The method of claim 33, wherein the clocking includes transmitting to the system bus data signals from the first transmit flip-flop based on the transmit clock signal and transmitting to the TSI circuit data signals from the second transmit flip-flop based on the transmit clock signal.

35. The method of claim 34, further comprising buffering data signals from the first transmit flip-flop before the data signals are provided to the system bus.

36. The method of claim 33, wherein using the receive clock signal comprises receiving at the first receive flip-flop data signals from the TSI circuit based on the receive clock signal and receiving at the second receive flip-flop data signals from a line in the system bus based on the receive clock signal.

37. The method of claim 36, further comprising buffering data signals from the system bus before they are received by the second receive flip-flop.

38. The method of claim 33, further comprising selectively enabling time slots on the system bus using a look-up table.

39. The method of claim 38, further comprising providing output enable signals to the first transmit flip-flop from the look-up table.

40. The method of claim 38, further comprising programming the look-up table using a control processor.

41. The method of claim 30, further comprising configuring the input-output technology being used by the hot swap logic circuit using an I/O flexibility circuitry.

42. The method of claim 41, further comprising configuring the I/O flexibility circuitry to provide the hot swap logic circuit with a resistive termination during a first period of time but not during a second period of time.

* * * * *

UNITED STATES PATENT AND TRADEMARK OFFICE
CERTIFICATE OF CORRECTION

| | |
|---|---|
| PATENT NO. | : 7,620,038 B1 |
| APPLICATION NO. | : 10/892727 |
| DATED | : November 17, 2009 |
| INVENTOR(S) | : Werner Niebel |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1350 days.

Signed and Sealed this

Fourteenth Day of December, 2010

David J. Kappos
*Director of the United States Patent and Trademark Office*